US010430042B2

(12) United States Patent
Osman et al.

(10) Patent No.: US 10,430,042 B2
(45) Date of Patent: Oct. 1, 2019

(54) INTERACTION CONTEXT-BASED VIRTUAL REALITY

(71) Applicant: Sony Interactive Entertainment Inc., Tokyo (JP)

(72) Inventors: Steven Osman, San Mateo, CA (US); Jorge Arroyo Palacios, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 405 days.

(21) Appl. No.: 15/282,654

(22) Filed: Sep. 30, 2016

(65) Prior Publication Data

US 2018/0095624 A1   Apr. 5, 2018

(51) Int. Cl.
*G06F 3/0484* (2013.01)
*G06F 17/27* (2006.01)
*G06T 19/00* (2011.01)
*H04L 12/58* (2006.01)
*G06Q 10/10* (2012.01)
*G06F 3/01* (2006.01)
*G06F 3/16* (2006.01)

(52) U.S. Cl.
CPC ........... *G06F 3/0484* (2013.01); *G06F 3/011* (2013.01); *G06F 3/167* (2013.01); *G06F 17/275* (2013.01); *G06Q 10/107* (2013.01); *G06T 19/006* (2013.01); *H04L 51/043* (2013.01); *G06F 2203/011* (2013.01)

(58) Field of Classification Search
CPC .................................................... G06F 3/0482
USPC ........................................................ 715/727
See application file for complete search history.

(56) References Cited

U.S. PATENT DOCUMENTS

| 7,623,860 | B2  |   | 11/2009 | Hurst |
| 9,164,653 | B2  | * | 10/2015 | Keondjian ........ G06F 17/30058 |
| 9,274,606 | B2  | * | 3/2016  | Yee .......................... G06F 3/017 |
| 9,292,090 | B2  | * | 3/2016  | Hirose .................... G06F 3/016 |
| 9,363,250 | B2  | * | 6/2016  | Matthews, III ......... H04L 63/08 |
| 9,589,595 | B2  | * | 3/2017  | Gao .................... G06K 9/00664 |
| 9,591,260 | B1  | * | 3/2017  | Inkpen Quinn ....... G06F 3/0482 |
| 9,906,621 | B2  | * | 2/2018  | Poiesz .................. H04L 67/306 |
| 2003/0073451 | A1 |   | 4/2003  | Kraft |
| 2005/0267738 | A1 |   | 12/2005 | Wilkinson et al. |
| 2007/0265831 | A1 | * | 11/2007 | Dinur .................... G06F 17/273 704/10 |
| 2007/0299664 | A1 |   | 12/2007 | Peters et al. |
| 2010/0100626 | A1 |   | 4/2010  | Allen et al. |
| 2011/0046939 | A1 |   | 2/2011  | Balasaygun |
| 2011/0111774 | A1 |   | 5/2011  | Nyberg et al. |
| 2012/0092329 | A1 | * | 4/2012  | Koo ..................... G06K 9/3258 345/419 |
| 2013/0272513 | A1 |   | 10/2013 | Phadnis et al. |
| 2013/0289971 | A1 |   | 10/2013 | Parkinson et al. |

(Continued)

OTHER PUBLICATIONS

Steven Osman, Jorge Arroyo Palacios, "Language Input Presets for Messaging", related pending U.S. Appl. No. 15/282,257, non-final office action dated Aug. 3, 2017.

(Continued)

*Primary Examiner* — William D Titcomb
(74) *Attorney, Agent, or Firm* — John L. Rogitz

(57) ABSTRACT

Conversation-based context rules for altering virtual reality (VR) gaming and for switching between input languages based on heuristics related to past conversations between users.

20 Claims, 10 Drawing Sheets

(56) References Cited

U.S. PATENT DOCUMENTS

| | | | |
|---|---|---|---|
| 2013/0298037 A1* | 11/2013 | Matthews, III | H04L 63/08 715/753 |
| 2014/0035823 A1 | 2/2014 | Khoe et al. | |
| 2014/0039874 A1 | 2/2014 | Pelosi | |
| 2014/0052435 A1 | 2/2014 | Kanevsky et al. | |
| 2014/0184496 A1* | 7/2014 | Gribetz | G02B 27/017 345/156 |
| 2015/0161099 A1 | 6/2015 | Lee et al. | |
| 2015/0187358 A1 | 7/2015 | Chou | |
| 2015/0271113 A1* | 9/2015 | Ahn | H04L 51/10 709/206 |
| 2015/0338915 A1* | 11/2015 | Publicover | G06K 9/0061 345/633 |
| 2015/0347379 A1* | 12/2015 | Chaudhri | G06F 3/04842 715/773 |
| 2016/0034447 A1 | 2/2016 | Shin et al. | |
| 2016/0034449 A1 | 2/2016 | Davis et al. | |
| 2016/0036747 A1 | 2/2016 | Aalbers | |
| 2016/0109954 A1* | 4/2016 | Harris | G06F 3/017 345/156 |
| 2016/0110044 A1* | 4/2016 | Andrews | G06F 3/0484 715/706 |
| 2016/0210602 A1* | 7/2016 | Siddique | G06Q 20/0453 |
| 2016/0227203 A1* | 8/2016 | Inada | H04N 13/279 |
| 2017/0024372 A1 | 1/2017 | Bojja et al. | |
| 2017/0031897 A1 | 2/2017 | Zhang et al. | |
| 2018/0060029 A1* | 3/2018 | Kogan | G06F 16/3326 |

OTHER PUBLICATIONS

Steven Osman, Jorge Arroyo Palacios, "Language Input Presets for Messaging", file history of related U.S. Appl. No. 15/282,257, filed Sep. 30, 2016.

Steven Osman, Jorge Arroyo Palacios, "Language Input Presets for Messaging", related U.S. Appl. No. 15/282,257, Applicant's response to Non-Final Office Action filed Oct. 11, 2017.

Steven Osman, Jorge Arroyo Palacios, "Language Input Presets for Messaging", related U.S. Appl. No. 15/282,257, Applicant's Appeal Brief filed Mar. 15, 2018 in response to Final Office Action.

\* cited by examiner

User Interfaces for Two Player Logic

INTERACTION CONTEXT-BASED VIRTUAL REALITY

FIELD

The application relates generally to interaction context-based virtual reality.

BACKGROUND

Multi-lingual people sometimes run into an issue when messaging back and forth to multiple friends in that they need to remember to switch the language input on their device as they switch from discussing with one friend to discussing with another. For example, imagine someone with a cell phone who has two text conversations with a friend, one in Spanish and the other in English. The user would need to remember to constantly toggle the phone's input message as he swaps between talking to the two. If he forgets to switch then the input mechanism will provide garbled input because it is doing auto-completion with the wrong language. A similar problem would arise on a computer game console in which a player is trying to send messages to multiple friends but in different languages.

Such conversational contexts may also be implicated more generally, for example, in virtual reality (VR) gaming for these and additional purposes.

SUMMARY

As understood herein, a user's profile data and input history may be used to alleviate the problems noted above.

Accordingly, a device includes a computer memory that is not a transitory signal and that in turn includes instructions executable by at least one processor to access at least one stored record of computer-aided communication between at least first and second users, analyze the record for context, and determine whether to alter at least one computer parameter based on analyzing the record for context.

The computer parameter may include a language used by a speech recognition module and/or a language used by an automatic text correction module. The computer parameter may also include presentation of a widget, such that for a first context a first widget is presented and for a second context a second widget is presented. Additionally, the computer parameter may include presentation of a virtual reality (VR) scene, such that for a first context a first VR scene is presented and for a second context a second VR scene is presented.

In addition to or in lieu of the foregoing, the computer parameter may include presentation of a file type selector, such that for a first context a first file type selector is presented and for a second context a second file type selector is presented. Still further, the computer parameter may include presentation of a chat application, such that for a first context a first configuration of the chat application is presented and for a second context a second configuration of the chat application is presented.

In another aspect, a method includes accessing at least one record of communication between first and second users, generating a result of the accessing using a computer, determining whether to alter at least one computer parameter using the result, altering the at least one computer parameter responsive to determining to alter the at least one computer parameter, and not altering the at least one computer parameter responsive to determining not to alter the at least one computer parameter.

In still another aspect, an apparatus includes a processor and storage accessible to the processor. The storage bears instructions executable by the processor to identify at least one record of at least one voice and/or text communication between at least first and second computerized devices of respective first and second users. The instructions are also executable to identify at least one context of the at least one voice and/or text communication and, based at least in part on identification of at least one context of the at least one voice and/or text communication, establish at least one computer parameter on at least the first computerized device.

The details of the present application, both as to its structure and operation, can best be understood in reference to the accompanying drawings, in which like reference numerals refer to like parts, and in which:

DETAILED DESCRIPTION

Figure 1:
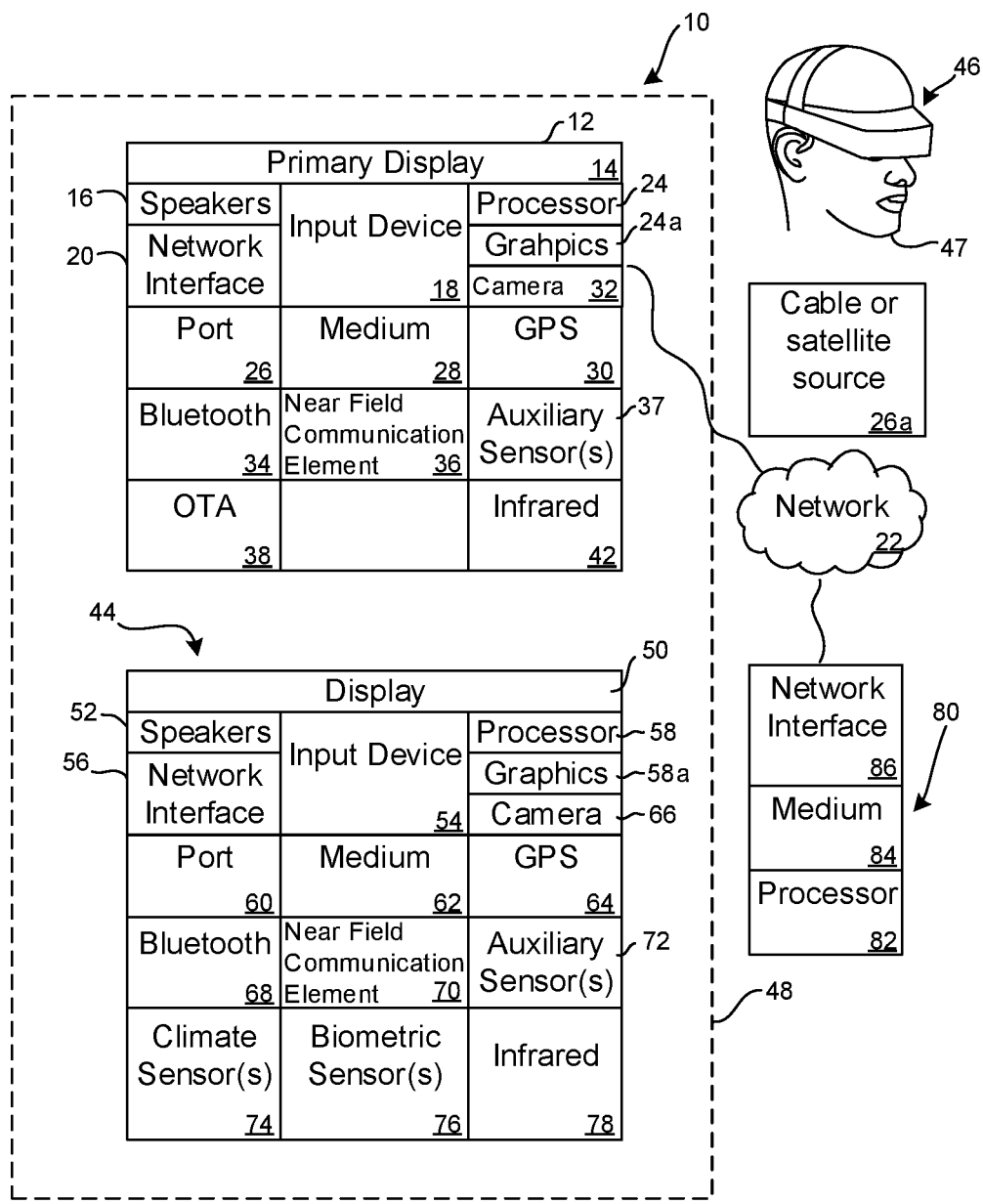
FIG. 1 is a block diagram of an example system including an example in accordance with present principles.

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hardwired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24 including. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown. In the example shown, only two CE devices 44, 46 are shown, it being understood that fewer or greater devices may be used. For example, principles below discuss multiple players 47 with respective headsets communicating with each other during play of a computer game sourced by a game console to one or more AVD 12, as an example of a multiuser voice chat system.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
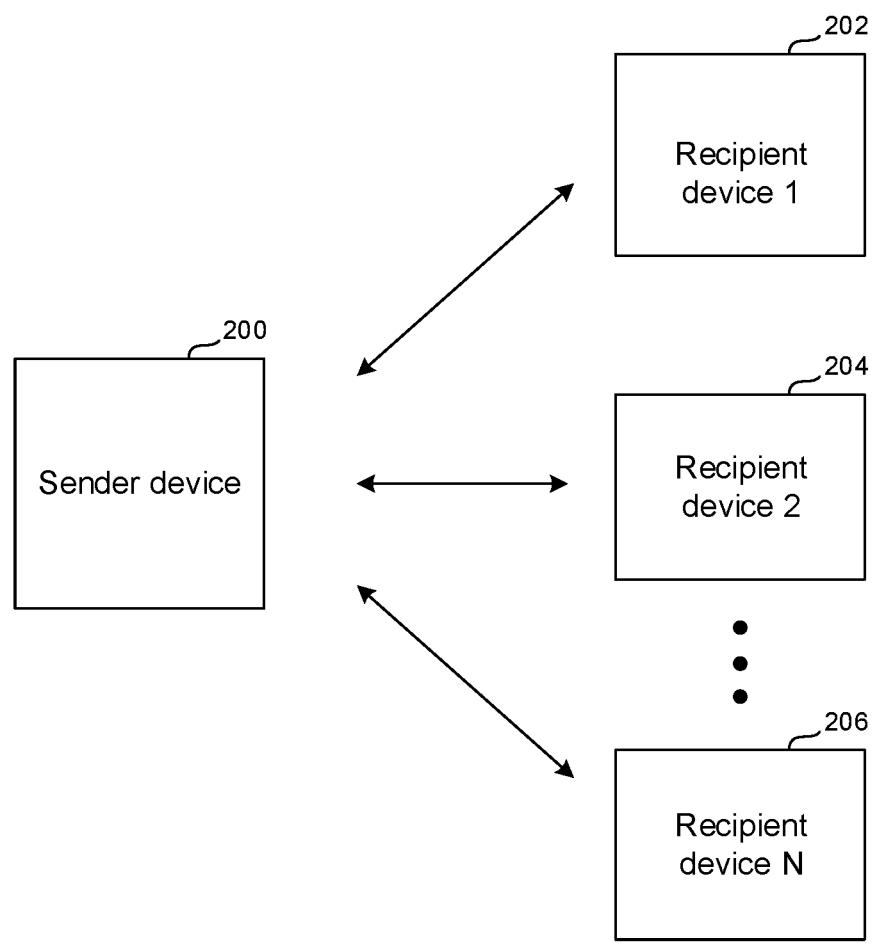
FIG. 2 is a block diagram of example devices in communication with each other in accordance with present principles.

FIG. 2 shows plural devices 200, 202, 204, and 206 communicating with each other over a network, such as a gaming network, in accordance with present principles. The devices 200, 202, 204, and 206 may include some or all of the components discussed above with respect to the devices described above in reference to FIG. 1.

As may be appreciated from the arrows shown in FIG. 2, a sender device 200 associated with a first user may communicate with a first recipient device 202 associated with a second user and a second recipient device 204 associated with a third user. The sender device 200 may also communicate with up to N recipient devices 206 respectively associated with still other users. Communication between the sender device 200 and one or more of the devices 202, 204, and 206 may thus occur for the sender device 200 to, for example, undertake present principles including those described in reference to FIG. 3.

Figure 3:
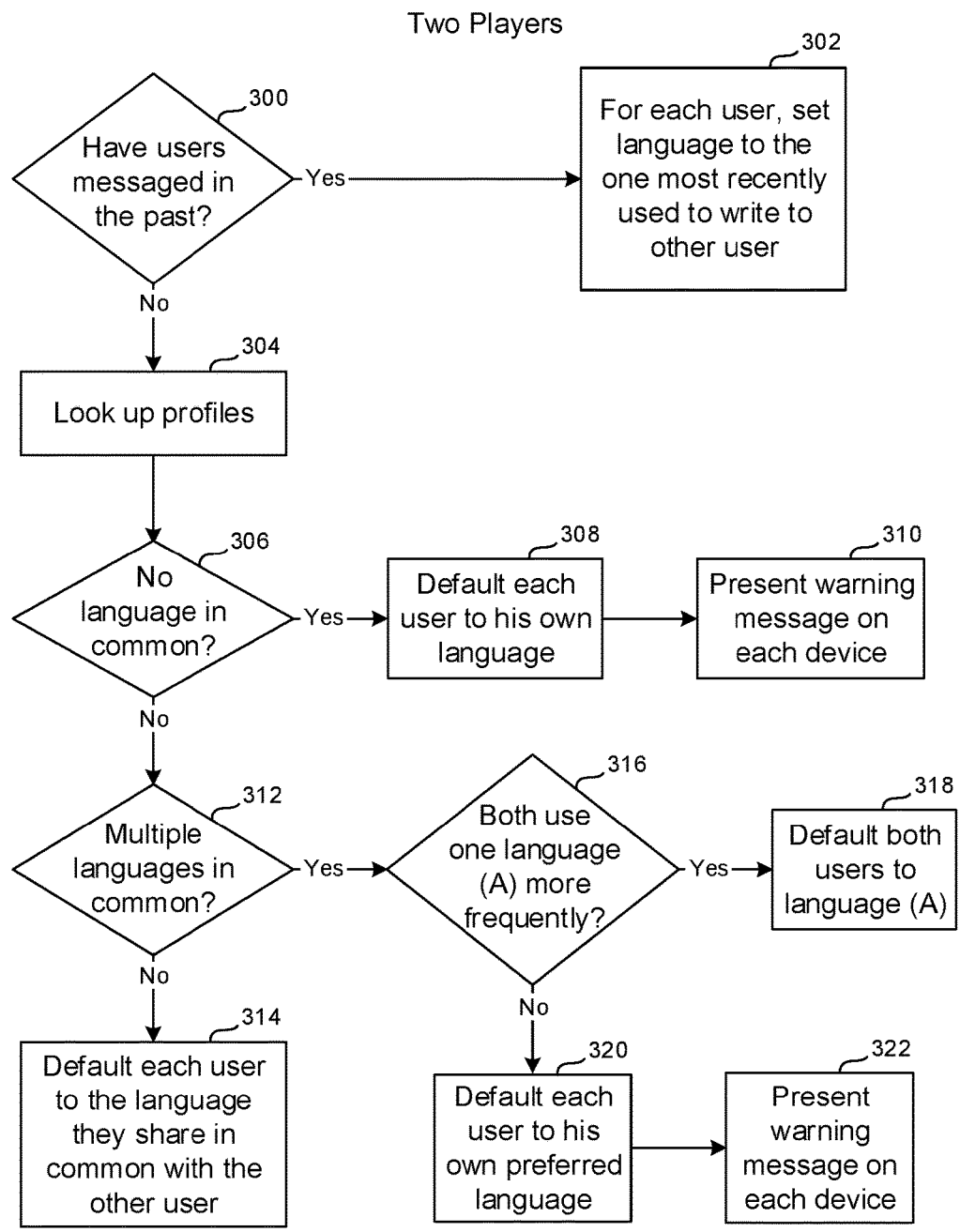
FIG. 3 is a flow chart of example logic in accordance with present principles.

FIG. 3 is a flow chart of an example algorithm that may be executed by a device such as the sender device 200, a server, or any of the other devices described herein for configuring one or more language settings for message communication between two devices in accordance with present principles. Thus, in some embodiments the logic of FIG. 3 may be executed by a server coordinating communication between two devices and that configures language settings for each one to communicate with the other, and indeed the logic of FIG. 3 will be described as though being executed by such a server. However, it is to be further understood that the logic of FIG. 3 may be executed by either of the two devices as well to configure languages settings at least for themselves if not for both devices.

The logic of FIG. 3 may begin at decision diamond 300 where, in order to configure message and/or language settings for at least a first device for the first device to transmit messages in one language or another to a second device, the logic may determine whether first and second users respectively associated with the first and second devices have messaged each other in the past. This may be determined, for example, based on a history of past wireless text communication between the users and/or associated devices.

Responsive to an affirmative determination at diamond 300, the logic may move to block 302. At block 302 the logic may, for each user's associated device to communicate with the other user's device, configure at least a first language setting, with the first language setting establishing a particular language for composing messages to the other device as being the same language that was previously used for messages in a most recent past communication between the first and second devices.

Referring back to diamond 300, responsive to a negative determination the logic may instead move from diamond 300 to block 304. A negative determination at diamond 300 may be based on, for example, a determination that no history exists of past wireless communication between the users and/or associated devices. At block 304 the logic may access or otherwise lookup respective profiles for each user and/or for each associated device. Responsive to looking up the respective profiles, the logic may then proceed to decision diamond 306.

At diamond 306 the logic may determine whether the first and second users have no language in common based on a comparison of information regarding languages used by each user as indicated in each respective profile that is looked up. The information in each respective profile may have been indicated by the respective user himself/herself when providing input of a language preference.

Responsive to an affirmative determination at diamond 306, the logic may move to block 308. At block 308 the logic may establish and/or default each device's language setting for composing a message to the other device to the associated user's own language (e.g., their primary language, their first-learned language, etc.). The associated user's own language may be identified based on indication from the associated user of a language preference, and/or based on default manufacturer settings for the respective device. The associated user's own language may also be identified based on identification of a language in which a person's name is presented, such as a message recipient's name as indicated by a messaging application used to message the other user/device, or as indicated in a contact database or address book designated by the associated user for that user/device. Further, the associated user's own language may be identified based on identification of a language in which a menu is presented on that user's device(s), a language in which a widget is presented on that user's device(s), and/or a language in which a virtual keyboard is presented on that user's device(s).

For example, the logic may identify the associated user's own language by identifying the name of a person to which a message is to be sent, identifying a language associated with the name and hence identifying the language. E.g., "Mary" may be associated with English whereas "Maria" may be associated with Spanish. So responsive to identifying "Mary", at block 308 the logic may establish English as the language to use for message composition to Mary's device, whereas if the logic identified "Maria" at block 308 the logic may establish Spanish as the language to use for message composition to Maria's device.

The logic may then proceed from block 308 to block 310, where the logic may present a warning message on each device's display that the other user/device with which messages are to be exchanged does not share or otherwise have a language in common with the user to which the warning message is presented. Audible warning messages and tactile warning messages (e.g., vibrations) may also be used.

Referring back to decision diamond 306, note that responsive to a negative determination the logic may instead move to decision diamond 312 rather than block 308. At decision diamond 312 the logic may determine, based on a comparison of information regarding languages used by each user as indicated in each respective profile that is looked up, whether the first and second users have multiple languages in common. Responsive to a negative determination at diamond 312 the logic may move to block 314. At block 314 the logic may determine the one and only one language the users share in common with each other as identified from their respective profiles, and establish and/or default each user's language setting for messaging the other respective device to that one and only one language.

However, responsive to an affirmative determination at diamond 312 that the users have multiple languages in common, the logic may instead proceed to decision diamond 316. At diamond 316 the logic may determine whether one or both users use one of the multiple languages more/most frequently, e.g., for messaging in general regardless of recipient, specifically for messaging between the first and second users using their respective devices, and/or for composing other text such as to compose text for a word processing document. The determination at diamond 316 may be based on a weighted sum that uses, for example, the number of past messages from one of the respective devices to the other that used one language as opposed to another, or the number of past conversations comprised of plural messages back and forth that employed one language as opposed to another. The more-frequently used language is generally designated language "A" in this example.

Responsive to an affirmative determination at diamond 316, the logic may proceed to block 318. At block 318 the logic may establish and/or default each user's language setting for messaging the other respective device to the more-frequently used language for that user and/or respective device, which in this case is language "A".

However, responsive to a negative determination at diamond 316, the logic may instead proceed to block 320 rather than block 318. At block 320, responsive to the first and second users having plural languages in common but neither language being determined as used more frequently than the other, the logic may establish and/or default each user's language setting for messaging the other respective device to that user's own language. The logic may then move from block 320 to block 322 where the logic may present a warning message on each device's display indicating that plural languages are common between the first and second users but that the system/device does not know which to establish for the language setting(s) for messaging. Audible warning messages and tactile warning messages may also be used.

Before moving on in the detailed description, it is to be understood that in addition to or in lieu of determining languages that the first and second users may have in common based on profile information as described above, such determinations may also be based on, for example, a language in which previous most-recent messages were exchanged with other users/devices, a language in which a most-recent word processing document was composed, a language in which a most-recent Internet search or device search was executed, a language in which most of one of the user's/device's software is based, a most-used language in websites visited by the respective user/device, etc.

Based on the foregoing, it may be appreciated that when a first user of the first device is messaging a second user of a second device, an appropriate language for messaging to the second user/device may be established in a language setting for the first device for messaging to the second device. Furthermore, should a user also be messaging a third user of a third device and toggling back and forth between message chains so as to compose messages to both, the first user may seamlessly toggle back and forth between conversations/chains to compose a message to the second user in one language and to compose a different message to the third user in another language without having to reset language settings for his or her device from one language to another each time the user switches conversations/chains.

Figure 4:
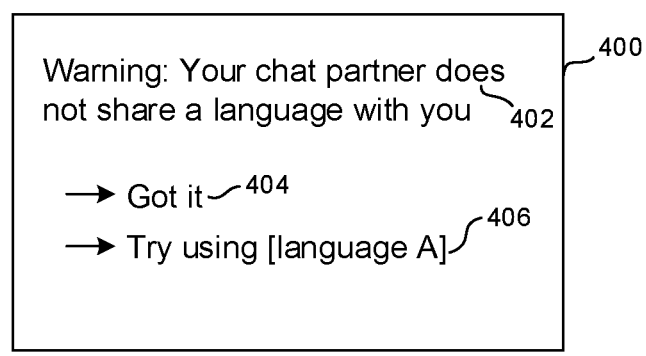
FIGS. 4 and 5 are example user interfaces (UIs) in accordance with present principles.

FIG. 4 shows an example warning user interface (UI) 400 that may be presented on a display of a user's device, for example, at block 310 described above. The UI 400 may include a warning message 402 indicating that the user's chat or messaging partner does not have a language in common with the user. The UI 400 may also include a "got it" selector 404 that may be selectable to one or both of dismiss the UI 400 and define a language setting for communication with the chat partner using the user's own language. The UI 400 may further include a selector 406 indicating a language spoken by the user—language A in this example—and that may be selectable to define a language setting for communication with the chat partner using language A.

Figure 5:
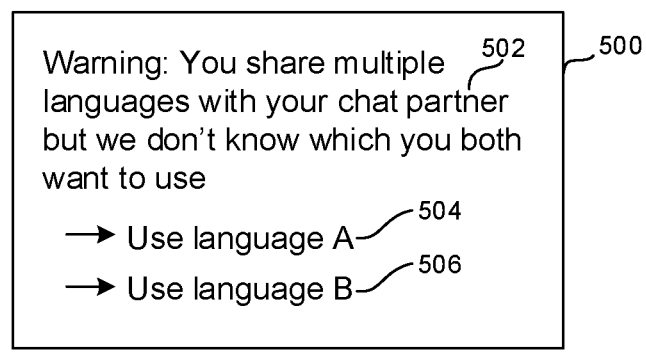

FIG. 5 shows an example warning or advisory UI 500 that may be presented on a display of a user's device, for example, at block 322 described above. The UI 500 may include a warning message 502 indicating that the user's chat or messaging partner shares multiple languages with the user but that the device or system could not identify which language the two prefer or want to use to compose messages to each other. The UI 500 may therefore include a selector 504 that is selectable to define language A as the language to use, while a selector 506 may be presented on the UI 500 that is selectable to define language B as the language to use.

Figure 6:
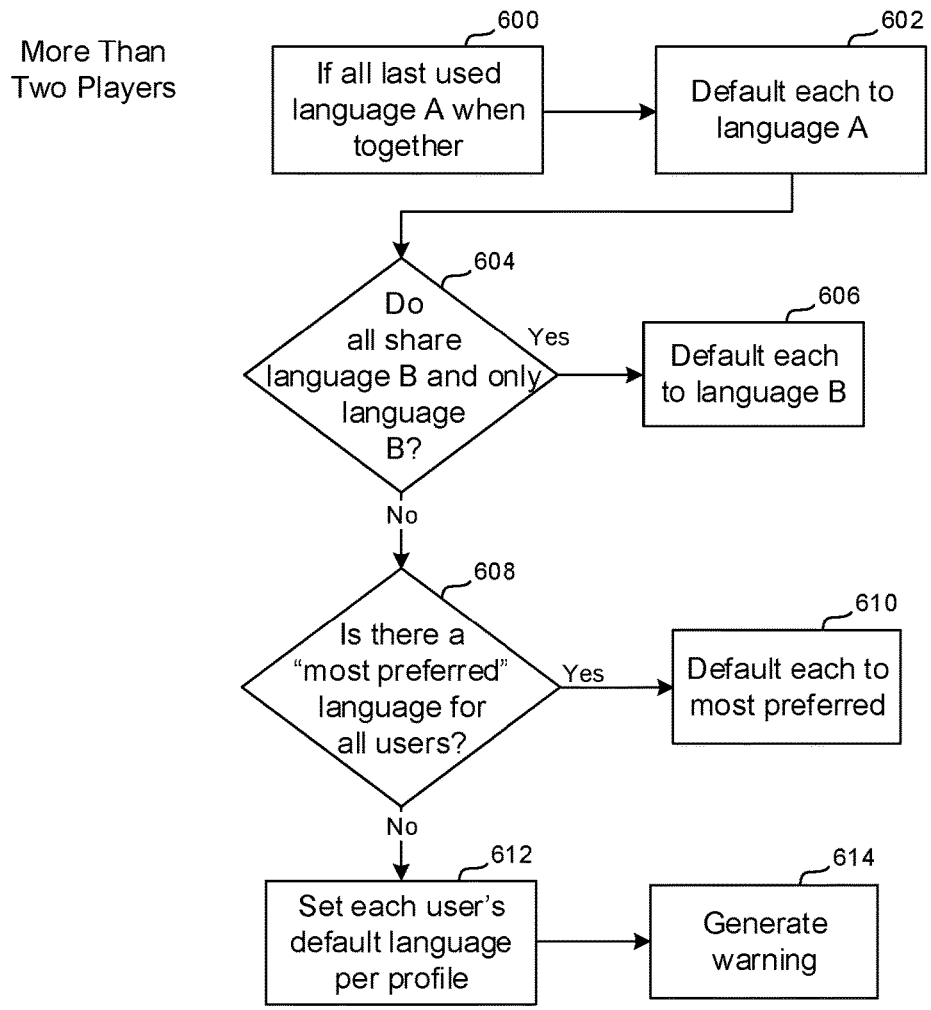
FIG. 6 is a flow chart of example logic in accordance with present principles.

Continuing the detailed description in reference to FIG. 6, it shows a flow chart of an example algorithm that may be executed by a device in accordance with present principles for configuring one or more language setting for message communication between more than two devices in accordance with present principles. In some embodiments the logic of FIG. 6 may also be executed by a server coordinating communication between more than two devices and configuring language settings for each one to communicate with the others, and indeed the logic of FIG. 6 will be described as though being executed by such a server, though it is to be further understood that the logic of FIG. 6 may be executed by any one of the more than two devices as well.

In any case, FIG. 6 will be described in reference to first, second, and third devices respectively associated with first, second, and third users. The logic of FIG. 6 may begin at block 600 where the logic may determine whether first, second, and third users all last used language A when messaging each other. This may be determined, for example, based on a history of past wireless text communication between the users and/or associated devices.

From block 600 the logic may move to block 602 where the logic may, responsive to determining that the first, second, and third users all last used language A when messaging each other, establish language A in a language setting for each user's device, and/or for the message chain itself to be created or continued. However, if it is not determined that the first, second, and third users all last used language A when messaging each other, the logic may proceed to decision diamond 604.

At diamond 604 the logic may determine whether all the users share language B and only language B with each other. This may be determined using any of the methods described herein, such as by accessing a profile for each user and comparing language information indicated in each profile. Responsive to an affirmative determination at diamond 604, the logic may proceed to block 606 where the logic may establish language B in a language setting for each user's device, and/or for the message chain itself to be created or continued.

However, responsive to a negative determination at diamond 606 the logic may instead move to decision diamond 608. At diamond 608 the logic may determine whether there is a most preferred language for all users. The determination at diamond 608 may be based on, for example, a weighted sum or average using the number of past messages exchanged between the respective devices that used one language as opposed to another, the number of past conversations for each user's device that employed one language as opposed to another, a language used to compose the most text for other purposes such as to compose a word processing document, etc.

Responsive to an affirmative determination at diamond 608, the logic may move to block 610 where the logic may establish the single most preferred language for each user's device in a language setting for each user's respective device so that messages composed thereat may be automatically composable in the language most preferred by all the users. However, responsive to a negative determination at diamond 608, the logic may instead proceed to block 612.

At block 612 the logic may establish a language setting for each user's device to that respective user's own default language as indicated in a respective user profile for that user. Thereafter, the logic may proceed to block 614 where the logic may generate a warning message for display at each user's respective device. For example, at block 614 a warning message may be generated indicating that the first, second, and third users do not all share one language in common with each other.

Figure 7:
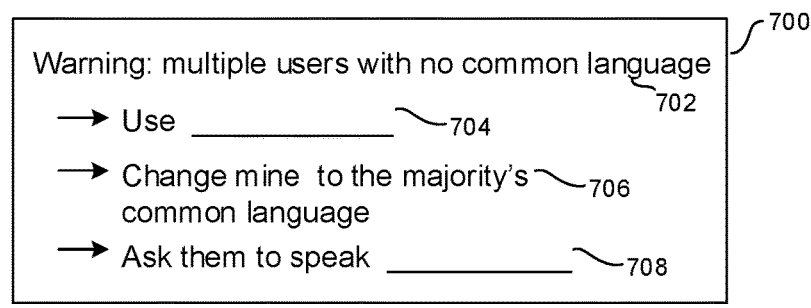
FIGS. 7 and 8 are example user interfaces (UIs) in accordance with present principles.

An example of such a warning message is shown in FIG. 7, which shows a UI 700 that may be presented on a display of each user's device. The UI 700 may include a message 702 indicating that multiple users of the first, second, and third users do not have a language in common with each other, even if two of the three have one language in common. The UI 700 may also include a selector or language entry field 704 at which a user may select/define a language to be established and used for messages to be composed and sent to the other two users/devices.

The UI 700 may also include a selector 706 that is selectable to define the language to be established and used as a language shared by a majority of the users. Additionally, the UI 700 may include a selector or language entry field 708 at which a user may select/define a language to request the other users/devices to use for messaging. Thus, in some embodiments and responsive to selection of the selector 708, the device at which the selector 708 is selected may transmit a request to the other two devices that asks them to use the requested language for messaging.

Figure 8:
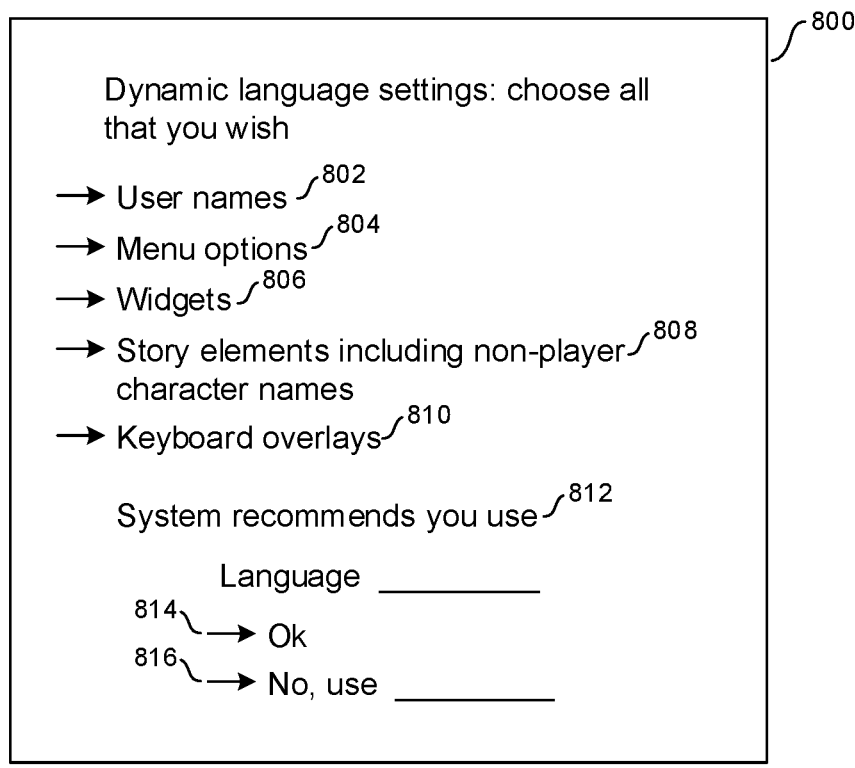

FIG. 8 shows an example UI 800 that may be presented on the display of a user's device for configuring dynamic language settings in accordance with present principles. The UI 800 may include selectors 802, 804, 806, 808, and 810, with each being selectable to configure the device to establish a language setting for messaging another user/device in conformance with the respective selector. Thus, selector 802 may be selected to configure the device to establish a language setting for messaging based a language associated with a user's name (e.g., a message recipient's name). Selector 804 may be selected to configure the device to establish a language setting for messaging based a language in which a menu and/or menu options are presented.

In the context of messaging through a video game platform while playing a video game, selector 806 may be selected to configure the device to establish a language setting for messaging during video gaming as a language in which story elements for the video game are presented. Thus, in some examples and based on selection of selector 808, a language setting may be established as a language in which a non-player character (NPC) name is presented and/or in which the NPC converses in the video game. As another example, based on selection of selector 808, a language setting may be established as a language in which story lines are presented that provide context for the video game.

Describing the aforementioned selector 810, it may be selected to configure the device to establish a language setting for messaging based on a language in which a virtual keyboard/keyboard overlay is presented on a display in accordance with present principles.

FIG. 8 also shows an indication 812 that the user's device and/or a system undertaking present principles recommends that the user use a particular language for messaging in accordance with present principles. Thus, an "ok" selector 814 may be presented that is selectable to configure the device to establish a language setting for messaging in the particular language recommended by the device/system. Another selector or language entry field 816 may also be presented to select or define another language for the device/system to establish as the language to use for messaging.

Figure 9:
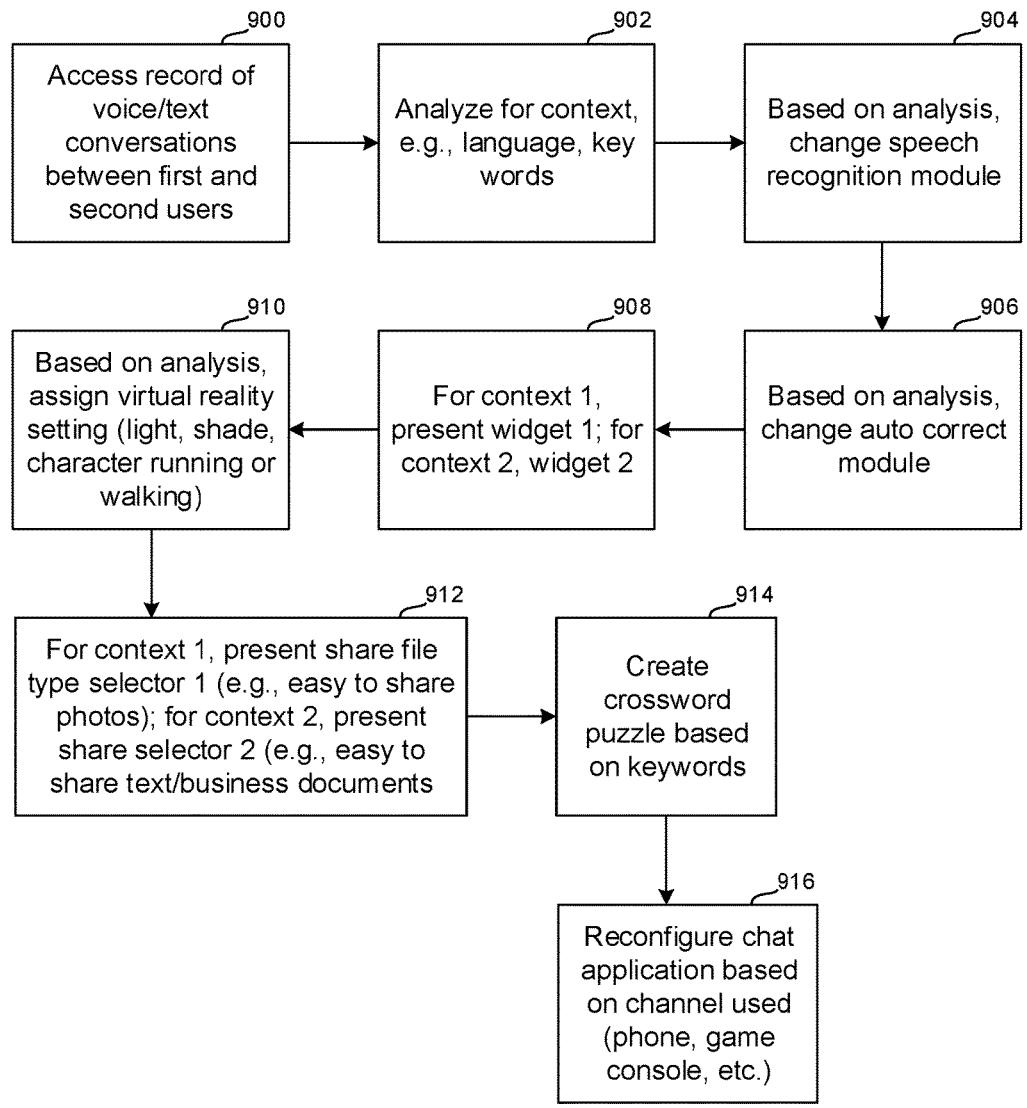
FIG. 9 is a flow chart of example logic in accordance with present principles.

Now in reference to FIG. 9, it shows logic that may be executed by a device/system while initiating or facilitating video game play between a first user and a second user using respective first and second devices in accordance with present principles. For example, the logic of FIG. 9 may be executed to establish and use a language at one of the first and second devices for various aspects of messaging and graphics presentation during video game play using that device.

Beginning at block 900, the logic may access a record of at least one computer-aided communication between the first and second users and/or respective first and second devices, such as a record of voice and/or text conversations between the first and second users. The record may be stored and accessed at the first device, the second device, and/or at a server coordinating gameplay between the first device and the second device. Responsive to accessing the record, the logic may move from block 900 to block 902.

At block 902 the logic may analyze the record for context such as a language that the first and second users/devices have used in the past or are currently using for communication with each other, topics identified from keywords contained in such communications, topics identified from recurring words contained in such communications, etc. From block 902 the logic may then, based on analyzing the record for context, determine whether to alter one or more computer parameters in accordance with present principles so that responsive to determining to alter at least one computer parameter the at least one computer parameter is altered, and responsive to determining not to alter the at least one computer parameter the at least one computer parameter is not altered.

Thus, after block 902 the logic may proceed to block 904 where the logic may, based on the analysis at block 902, establish or change a language used by a speech recognition module that converts speech input from a user to text for transmission to another of the users. For example, the logic may establish the language for the speech recognition module to be a language in which the first user and the second user previously provided voice input that was then communicated to the other respective user as text, such as in a most-recent conversation, in a majority of conversations between the first and second users, or in a threshold number of most-recent conversations.

The logic may then move from block 904 to block 906. At block 906 the logic may, based on the analysis at block 902, establish or change a language for a dictionary used by an automatic text correction module that corrects text input by a user or derived from audible user input. For example, the logic may establish the language for the automatic text correction module to be a language in which the first user and the second user previously communicated using their respective devices in a most-recent text conversation, and a dictionary employed by the module may even be changed based on recognized speech or text between the users indicating one of a business or professional relationship, a technical relationship, a familial relationship, etc.

From block 906 the logic of FIG. 9 may then continue to block 908. At block 908 the logic may, for a first context identified during the analysis at block 902, present a first software widget to the first and/or second users via displays on their respective devices. However, for a second, different context identified during the analysis at block 902, at block 908 the logic may instead present a second, different software widget to the first and/or second users via displays on their respective devices.

Thereafter the logic may proceed to block 910. At block 910 the logic may, based on the analysis at block 902, assign one or more virtual reality (VR) settings such as for VR video gaming or other VR interaction. The VR settings may include, for example, one or more colors, lighting, or shading in which VR objects are presented. The VR settings may also include which VR objects themselves are presented, where those VR objects are presented, how those VR objects are presented (e.g., shape and size, with motion or with no motion, etc.), when those VR objects are presented, etc. For example, based on a context identified at block 902, the logic at block 910 may assign a VR setting for presentation of a character as running instead of walking, or vice versa.

The VR settings may further include which VR scenes are presented, how those VR scenes are presented, when those VR scenes are presented, etc. For example, based on a context of voice conversation identified at block 902, the logic may present a first VR scene responsive to a first context being identified at block 902 or a second VR scene responsive to a second, different context being identified at block 902. As another example, based on a context of voice conversation identified at block 902, the logic may perform a first alteration to the background of a VR scene or a second alteration to the VR scene.

From block 910 the logic may then proceed to block 912. At block 912 the logic may, for a first context identified at block 902, present a first file type selector and, for a second context identified at block 902, present a second file type selector that is different from the first file type selector. For instance, responsive to a first context being identified at block 902, an images file type selector may be presented to allow one of the users to easily share photographs with the other user, whereas responsive to a second context being identified at block 902 a documents file type selector may be presented to allow one of the users to easily share text or business documents with the other user.

From block 912 the logic may move to block 914. At block 914 the logic may generate and present a crossword puzzle based on the analysis executed at block 902. The crossword puzzle may include words identified as, for example, key words or recurring words from communications between the first and second users. After block 914 the logic may proceed to block 916.

At block 916 the logic may reconfigure a universal chat application based on a channel being used for communication between the first and second users (such as a phone channel, a video game console channel, etc.) such that for a first context identified at block 902 a first configuration of the chat application may be presented and for a second context identified at block 902 a second configuration of the chat application may be presented.

Figure 10:
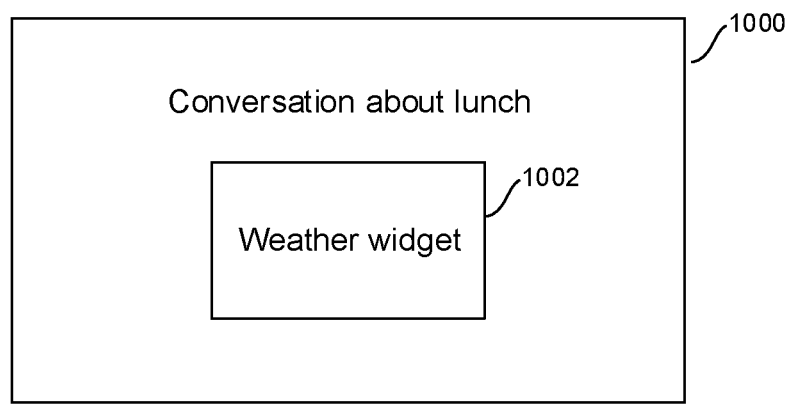
FIGS. 10-15 are example user interfaces (UIs) in accordance with present principles.
Figure 11:
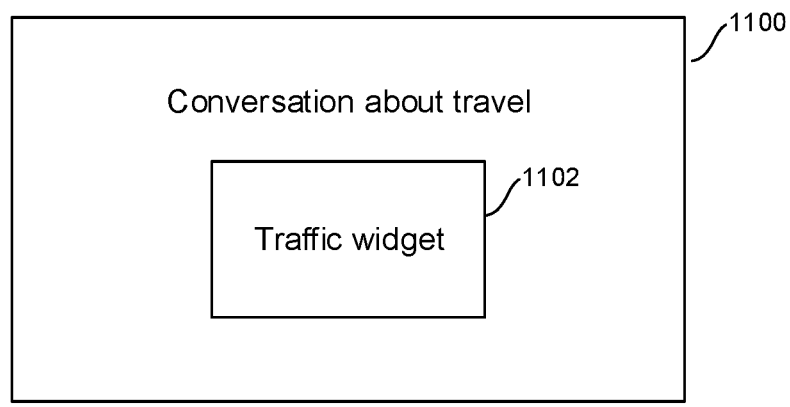

Reference is now made to FIGS. 10 and 11, which respectively show example user interfaces (UIs) 1000, 1100 presentable on the display of a device undertaking present principles, such as in conjunction with the execution of the logic of FIG. 9. The UI 1000 may be presented, for example, at block 908 based on a first context being identified from a conversation during which the keyword "lunch" was used. Based on identification of this first context involving lunch, a weather widget 1002 may be presented for interaction by a user so the user can see current and future weather that may affect travel to a lunch gathering and the lunch gathering itself.

However, based on a second context being identified from a conversation during which the keyword "travel" was used, the UI 1100 as shown in FIG. 11 may be presented. Based on identification of this second context involving travel, a traffic widget 1102 may be presented for interaction by a user so that the user can see traffic patterns and slowdown areas that may affect a user's potential travel.

Widgets (and other applications) may be presented based on other contexts as well. For instance, one widget may be presented based on the context of messaging a first person and another widget may be presented based on the context of messaging a second person. Which widget may be presented may be further based on that widget being selected at least a threshold number of previous times when previously messaging the other person.

Even further, a widget presented to a user during messaging with a certain person may be adaptable based on past conversations with that person. For example, a suggestion widget may suggest a particular video game to play with the other person based on past messaging involving that video game. A game thread or storyline may even be changed based on past messaging involving that video game.

As another example involving a first application icon that may be presented on the display of a user's device responsive to messaging a first person, the first application icon may be presented for a first application that the user has invoked at least a threshold number of times when previously messaging the first person, and the first application may even be automatically launched responsive to messaging the first person. Responsive to messaging a second person different from the first person, another application icon may be presented for a second application that the user has invoked at least a threshold number of times when previously messaging the second person, and the second application may even be automatically launched responsive to messaging the second person. Additionally, various hot buttons may also be presented in the same way. Still further, for a person with whom the user has not previously messaged, commonalities between the user and person may be identified, e.g., based on profile information for each one, and one or more application icons, widgets, and/or hot buttons may be presented that are associated with the identified commonalities.

Figure 12:
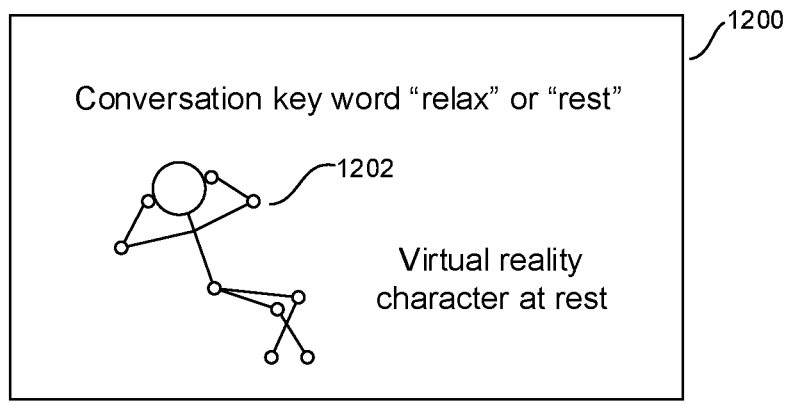
Figure 13:
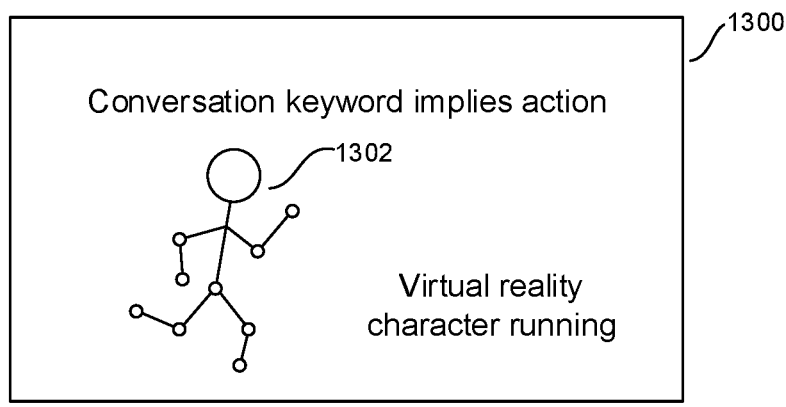

Continuing the detailed description in reference to FIGS. 12 and 13, these figures which respectively show example virtual reality (VR) UIs 1200, 1300 presentable on the display of a device undertaking present principles, such as in conjunction with the execution of the logic of FIG. 9. The UI 1200 may be presented, for example, at block 910 based on a first context being identified from a conversation during which the keyword "relax" or "rest" was used. Based on identification of this first context involving relaxing or resting, a VR character at rest 1202 may be presented in a VR scene.

However, based on a second context being identified from a conversation during which a keyword was used that implies action or urgency, the UI 1300 as shown in FIG. 13 may be presented. Based on identification of this second context involving action or urgency, a VR character 1302 that is running may be presented in a VR scene.

VR objects may be presented based on other contexts as well. For instance, one VR object may be presented based on the context of messaging a first person and another VR object may be presented based on the context of messaging a second person. Which VR object a device is to present may be further based on that VR object being selected by the user at least a threshold number of previous times when previously messaging that respective person.

Still other VR alterations may be made based on contexts that are identified. For example, the clothes that a representation of the user is shown as wearing in VR space may be changed based on the user's relationship with another person also represented in the VR space with whom the user is messaging. E.g., if a beach buddy is represented in VR space with the user, the representation of the user in VR space may be dressed in beach clothes, whereas if the user's boss is represented in VR space with the user, the representation of the user in VR space may be dressed in a suit.

Figure 14:
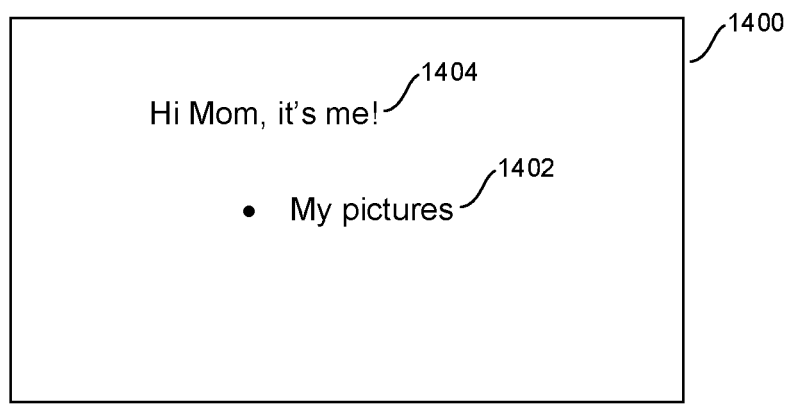
Figure 15:
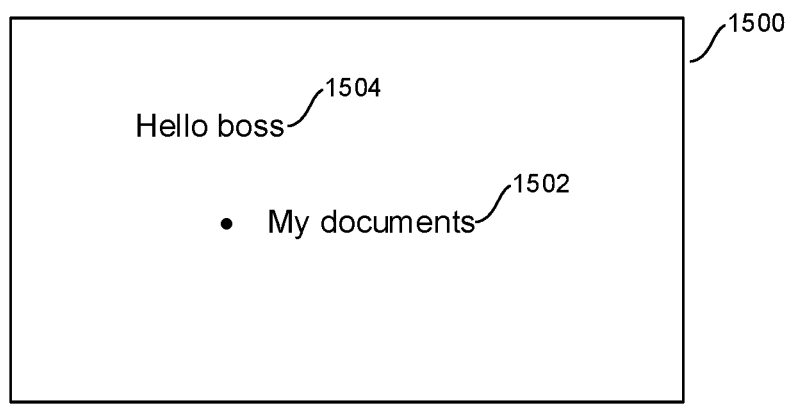

FIGS. 14 and 15 respectively show example UIs 1400, 1500 presentable on the display of a device undertaking present principles, such as in conjunction with the execution of the logic of FIG. 9. The UI 1400 may be presented, for example, at block 912 based on a first context of a conversation being identified as being a conversation with a user's mother. Based on identification of this first context involving conversing with the user's mother, a first file type selector 1402 may be presented that is selectable to browse and select an image file from a folder at which one or more images are stored so that the file may be transmitted to the user's mother as part of the user's text messaging 1404 with his/her mother.

However, based on a second context being identified as being a conversation with the user's boss or another person with whom the user has a business relationship, the UI 1500 shown in FIG. 15 may be presented. Based on identification of this second context involving conversing with the user's boss, a second file type selector 1502 may be presented that is selectable to browse and select a document from a folder at which one or more work-related documents are stored so that the file may be transmitted to the user's boss as part of the user's text messaging 1504 with his/her mother. Other file type selectors may be presented based on other contexts as well.

It may now be appreciated that present principles provide for using conversation histories and user profiles (that may be updated) to store a list of language preferences for a given user, and that these histories and profiles may be used to establish one or more language settings as disclosed herein. The profile may be generated by a device based on input from a user, by a device based on a record of past voice and text messaging in a specific language, by a device based on the language of software loaded onto the device, by a device based on what language a user performs searches in, and/or by a device based on what vendor/Internet service provider the user/device uses.

It is to also be understood that the establishment or change of language settings to a certain language may be used not just for message input for a user, but for other non-chat things as well such as player names in a video game that users will play with each other, menu options for menus in the video game, and story elements in the video game. Thus, in order to help a user feel like they are "in the mode" of a specific language that they share with their gameplay friends, the user's video game system may recommend or default to a common language of all those in the video game party.

Take, for instance, a game that has been localized to both Spanish and English for various regions. Suppose there is a female non-player character (NPC) in the game whose name is "Maria" in the Spanish translation but "Mary" in the English translation. By translating the names to a common language for the players and presenting those names to each user in the common language, a system undertaking present principles may enhance and expedite communication during a voice chat between the players. For players speaking English, one player may ask the other "What did Mary say?", while players speaking Spanish may ask each other " ¿Qué dijo María?"

This scenario may even be useful in local multiplayer games where two users log into their respective gaming accounts on a single video game console. The console may default to a language known to both users so when they play a game together they can both understand the dialogue and menus, where that common language may have been identified based on profile information accessed by the console.

It will be appreciated from the above discussion that it is desirable to allow users to communicate with different people in a VR/AR environment while accounting the fact that people talk, behave, act, and change their inter-personal space, physical appearance or virtual representation, depending on the person they are interacting with. One example is instant messaging applications, which can learn from user text input to provide predictive text, and ideally would also account for the different ways that the user interacts with different people. As understood herein, failure to account for the different ways that the user interacts with different people can result in such inconveniences as multi-lingual users encountering difficulties when messaging back and forth to multiple friends, in that they need to remember to switch the language input on their device as they switch from discussing with one to discussing with the other. This can lead to autocorrect text errors and bad entries in text dictionaries. Virtual and augmented reality facilitate the communication and enhance the interaction experience with other people and as understood herein would alter the VR/AR environment to account for factors such as language, interpersonal relationship, culture, age, gender, to provide appropriate interpersonal communication support.

Thus, in a VR/AR teleportation meeting, different aspects can be customized based on the person that the users will be interacting with. For example, settings about the virtual place where the meeting will take place can be established based on the identities of the conferees in the VR/AR teleportation meeting. Geographic location and environment layout are some examples of the settings that can be customized. The virtual meeting can take place in an office, at home, an outdoor area with romantic views, or a playground area depending if the meeting is with a colleague, a family member, partner or children.

Furthermore, settings related to the virtual representation of the user (avatar) can be established based on the individual characteristics of the user, including body appearance, gestures, gender, age, clothes, language, speech, accents. Similarly, settings related to avatar behavior, role and personality can be established based on the individual characteristics of the user. More detailed characteristics about the interactions can be customized based on the conversation receiver(s), such as emotional responses, interpersonal space, attitudes, personalities, leadership, dominance, passive, receptive. Examples can include preventing inappropriate behaviors of the user's avatar when the VR/AR is of a professional environment, whereas a more relaxed and joyful personality of the avatar may be implemented when the VR/AR is based on interacting with friends, partner, etc. Different inter-personal spaces can be presented in the VR/AR when respectively interacting with children, work colleagues, friends, etc.

It will be appreciated that whilst present principals have been described with reference to some example embodiments, these are not intended to be limiting, and that various alternative arrangements may be used to implement the subject matter claimed herein.

What is claimed is:

1. A device comprising:
at least one computer memory that is not a transitory signal and that comprises instructions executable by at least one processor to:
access at least one stored record of computer-aided communication between at least first and second users;
analyze the record for context;
based on analyzing the record for context, determine whether to alter at least one computer parameter, wherein the computer parameter includes at least one parameter selected from:
a language used by a speech recognition module;
a language used by an automatic text correction module that corrects text input by a user or derived from audible user input, the instructions being executable to change a dictionary employed by the text correction module based on recognized speech or text between the first and second users indicating a business or professional relationship, or a technical relationship, or a familial relationship;
presentation of a widget, such that for a first context a first widget is presented and for a second context a second widget is presented;
presentation of a virtual reality (VR) scene, such that for a first context a first VR scene is presented and for a second context a second VR scene is presented;
presentation of a file type selector, such that for a first context a first file type selector is presented and for a second context a second file type selector is presented;
presentation of a chat application, such that for a first context a first configuration of the chat application is presented and for a second context a second configuration of the chat application is presented.

2. The device of claim 1, wherein the computer parameter includes a language used by a speech recognition module.

3. The device of claim 1, wherein the computer parameter includes a language used by an automatic text correction module that corrects text input by a user or derived from audible user input, the instructions being executable to change a dictionary employed by the text correction module based on recognized speech or text between the first and second users indicating a business or professional relationship, or a technical relationship, or a familial relationship.

4. The device of claim 1, wherein the computer parameter includes presentation of a widget, such that for a first context a first widget is presented and for a second context a second widget is presented.

5. The device of claim 1, wherein the computer parameter includes presentation of a virtual reality (VR) scene, such that for a first context a first VR scene is presented and for a second context a second VR scene is presented.

6. The device of claim 1, wherein the computer parameter includes presentation of a file type selector, such that for a first context a first file type selector is presented and for a second context a second file type selector is presented.

7. The device of claim 1, wherein the computer parameter includes presentation of a chat application, such that for a first context a first configuration of the chat application is presented and for a second context a second configuration of the chat application is presented.

8. A method comprising:
accessing at least one record of communication between first and second users;
using a computer, generating a result of the accessing, the result comprising at least one context;
responsive to the result comprising a first context, presenting on at least one display at least a first user interface (UI) comprising a first widget for interaction by a user so the user can ascertain information relevant to the communication using the first widget; and
responsive to the result comprising a second context, presenting on the at least one display at least a second UI comprising a second widget for interaction by a user so the user can ascertain information relevant to the communication using the second widget.

9. The method of claim 8, comprising:
using the result, determining whether to alter at least one computer parameter, wherein the computer parameter includes a language used by a speech recognition module.

10. The method of claim 8, comprising:
using the result, determining whether to alter at least one computer parameter, wherein the computer parameter includes a language used by an automatic text correction module.

11. The method of claim 8, comprising:
using the result, determining whether to alter at least one computer parameter, wherein the computer parameter includes presentation of a widget, such that for a first context a first widget is presented and for a second context a second widget is presented.

12. The method of claim 8, comprising:
using the result, determining whether to alter at least one computer parameter, wherein the computer parameter includes presentation of a virtual reality (VR) scene, such that for a first context a first VR scene is presented and for a second context a second VR scene is presented.

13. The method of claim 8, comprising:
using the result, determining whether to alter at least one computer parameter, wherein the computer parameter includes presentation of a file type selector, such that for a first context a first file type selector is presented and for a second context a second file type selector is presented.

14. The method of claim 8, comprising:
using the result, determining whether to alter at least one computer parameter, wherein the computer parameter includes presentation of a chat application, such that for a first context a first configuration of the chat application is presented and for a second context a second configuration of the chat application is presented.

15. An apparatus, comprising:
a processor;
storage accessible to the processor and bearing instructions executable by the processor to:
identify at least one record of at least one voice and/or text communication between at least first and second computerized devices of respective first and second users;
identify at least one context of the at least one voice and/or text communication;
based at least in part on identifying that the context is a first context, present on at least one display at least a first virtual reality (VR) object undertaking a first action; and
based at least in part on identifying that the context is a second context, present on the at least one display at least the first VR object undertaking a second action different from the first action.

16. The apparatus of claim 15, wherein the instructions are executable to:
based at least in part on identification of at least one context of the at least one voice and/or text communication, establish at least one computer parameter on at least the first computerized device, wherein the computer parameter includes a language used by a speech recognition module.

17. The apparatus of claim 15, wherein the instructions are executable to:
based at least in part on identification of at least one context of the at least one voice and/or text communication, establish at least one computer parameter on at least the first computerized device, wherein the computer parameter includes a language used by an automatic text correction module that corrects text input by a user or derived from audible user input, the instructions being executable to change a dictionary employed by the text correction module based on recognized speech or text between the first and second users indicating a business or professional relationship, or a technical relationship, or a familial relationship.

18. The apparatus of claim 15, wherein the instructions are executable to:
based at least in part on identification of at least one context of the at least one voice and/or text communication, establish at least one computer parameter on at least the first computerized device, wherein the computer parameter includes presentation of a widget, such that for a first context a first widget is presented and for a second context a second widget is presented.

19. The apparatus of claim 15, wherein the instructions are executable to:
based at least in part on identification of at least one context of the at least one voice and/or text communication, establish at least one computer parameter on at least the first computerized device, wherein the computer parameter includes presentation of a virtual reality (VR) scene, such that for a first context a first VR scene is presented and for a second context a second VR scene is presented.

20. The apparatus of claim 15, wherein the instructions are executable to:
based at least in part on identification of at least one context of the at least one voice and/or text communication, establish at least one computer parameter on at least the first computerized device, wherein the computer parameter includes presentation of a file type selector, such that for a first context a first file type selector is presented and for a second context a second file type selector is presented.

* * * * *